July 7, 1925.  
D. P. GHADIALI  
COLOR WAVE PROJECTION APPARATUS  
Filed Sept. 10, 1923  
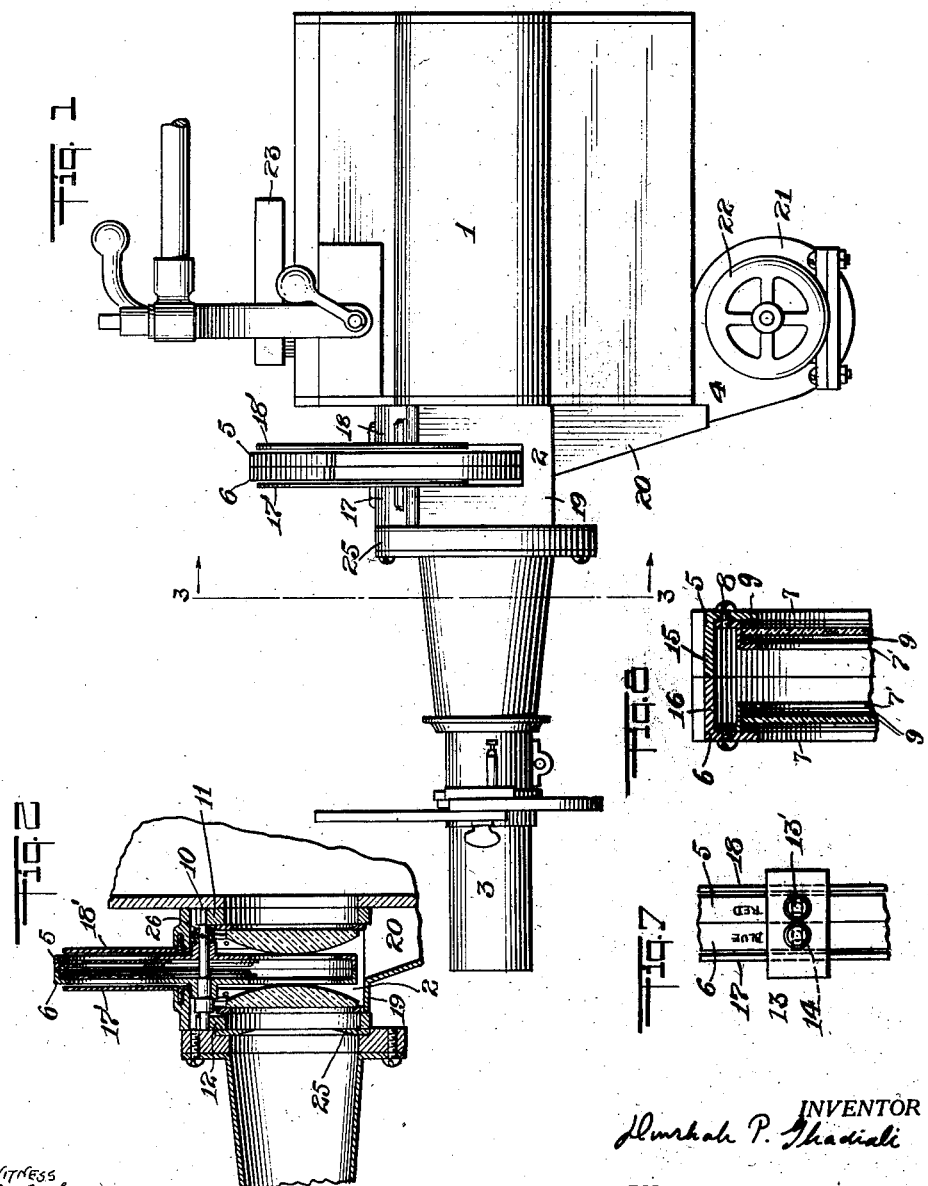
INVENTOR  
Dinshah P. Ghadiali  
BY  
Robert B. Killgore  
ATTORNEY  
WITNESS  
M. E. Lessin July 7, 1925.
D. P. GHADIALI
1,544,973
COLOR WAVE PROJECTION APPARATUS
Filed Sept. 10, 1923
2 Sheets-Sheet 2
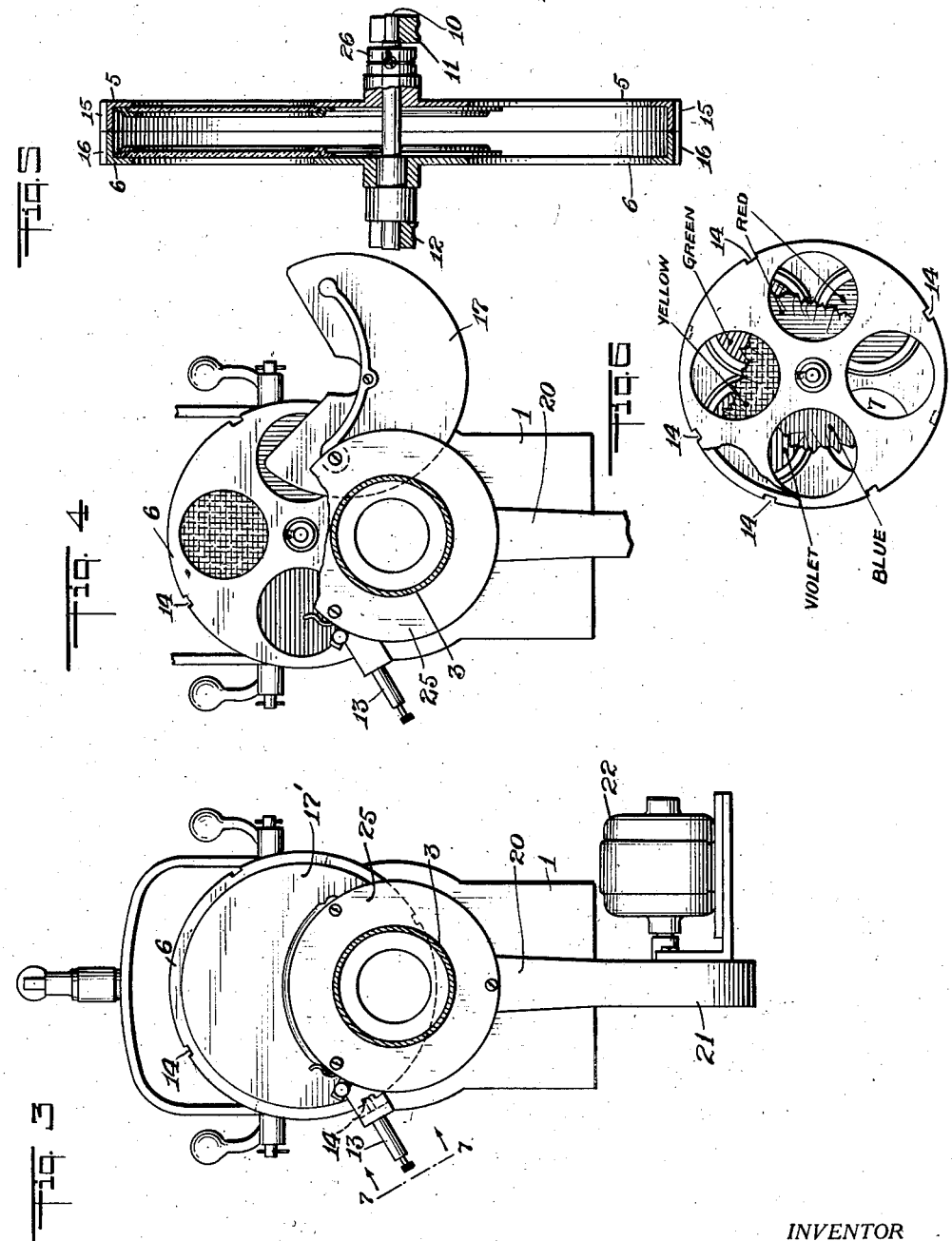
INVENTOR
Dinshah P. Ghadiali,
BY
Robert B. Killgore
ATTORNEY
WITNESS
M. E. Lessin

Patented July 7, 1925.

1,544,973

UNITED STATES PATENT OFFICE.

DINSHAH P. GHADIALI, OF PHILADELPHIA, PENNSYLVANIA.

COLOR-WAVE-PROJECTION APPARATUS.

Application filed September 10, 1923. Serial No. 661,894.

*To all whom it may concern:*

Be it known that I, DINSHAH P. GHADIALI, a citizen of the United States, residing at Philadelphia, in the county of Philadelphia and State of Pennsylvania, have invented certain new and useful Improvements in Color-Wave-Projection Apparatus, of which the following is a specification.

My invention relates to color wave projection apparatus intended primarily for use in the treatment of diseases by means of color waves emanating from selected portions of the spectrum and it is my object to produce a projector in which six color wave slides will produce twelve colors, which is so constructed that improper assembly of the color slide carriers and their improper insertion in the projector will be impossible, in which locking means are provided to maintain the proper register of the color slides, both with respect to one another and with the lens system, which is provided with color traps to prevent undesired color leakage and to protect the color slides not in use, which is provided with visual indicators for the color slides and which is provided with cooling means to prevent breakage of the color slides and lens elements.

In the drawing Fig. 1 is a side elevation of the projector; Fig. 2 a sectional view through the color wave slide structure; Fig. 3 a front view of the projector; Fig. 4 a front view of the color wave slide structure with the color traps open; Fig. 5 a sectional view of the color wave slide carriers and shaft; Fig. 6 a view of the color wave slide carriers partly broken away to show the arrangement of the color slides; Fig. 7 a detail view of the color slide carrier locking means; and Fig. 8 a detail view of the color slide mounting on the carrier.

The projector comprises four principal parts. A lamp housing 1, a color slide carrier 2, a lens system 3 and a cooling system 4, as shown in Fig. 1.

My invention relates primarily to the color slide carrier and to the cooling system whereby breakage of color slides is prevented.

The color wave slide system comprises two color slide carriers, 5 and 6, which are slidable or revolvable with respect to one another and together or separately with respect to the lens and lamp system, metal disks being shown in the drawings, although reciprocating carriers may be employed without departing from my invention. Each disk is provided with apertures 7, 7, four being the number generally employed. One disk carries the red, green and violet color slides in the order named, while one aperture is left blank, and the other disk carries the blue, yellow and a duplicate red color slide, one aperture also being left blank.

The color wave slides proper, red, green, violet, blue, yellow and duplicate red, are each secured to the carriers by a stepped ring 7' held by screws 8 passing through the carriers, elastic packing washers 9 being interposed between the color slides and the metal to avoid strains incident to heating and cooling which would otherwise tend to crack the color slides. (See Fig. 8).

A stepped shaft 10 is slipped through the color slide carrier hubs as is best shown in Fig. 5, the violet, green and red carrying disk having a large bore in the hub fitting the larger step which is nearer the stop collar, the other or duplicate red, yellow and blue carrying disk has a smaller bore in its hub and fits the reduced diameter of the shaft. The bearing ends of the shaft which enter the bearings 11 and 12 on the projector are also of different diameters so that the disks can neither be placed on the shaft in the wrong order nor can the assembled disks be placed in the machine improperly.

In order that each separate color slide may be accurately centered in the lens system, spring pressed bolts 13, 13' are mounted in the housing and engage a series of notches 14 on the disk edges so that when the bolts are in notches the color slides are central with the lens system.

As is best shown in Fig. 2 the color wave slides are preferably mounted between the condensing lenses.

To avoid color wave leakage from the color wave slide carriers the edges of the disks 5 and 6 are flanged at 15 and 16 so that the color wave slides are enclosed in a light-tight drum as is best shown in Fig. 5. To reduce color wave leakage further when the projector is in use, two flaps 17 and 18 are hinged to the projector and close the spaces on top of the color wave slide carriers and condensers and have vertical wings 17' and 18' covering the parts of the color wave slide carrying disks not between the condensers as is best shown in Figs. 1, 2, 3 and 4, the color wave traps being in closed position in Fig. 3 and the forward one open in Fig. 4. By opening the color wave traps the color wave slide disks may be inserted in or removed from the projector. The lower part of the color wave slide carrier space and condensers is protected by a permanent color wave trap or shield 19 which opens into a ventilator passage 20 which leads in turn to a blower fan 21 operated by a motor 22; the air is sent into the lamp housing and the condenser housing where the color wave slides are and finally exhausts out of the movable light-proof cowl 23 on the top of the lamp housing and the condenser housing. In practice, the lamp and the motor are on the same circuit so that the motor runs while the lamp is burning, thereby drawing air over the color wave slides, condensers, color and light housing and lamp, cooling the parts and avoiding heat breakage by blowing the heated air out. A similar effect can be produced by the use of a suction fan, reversing the process.

An iris diaphragm 25 in front of the condensers and color wave slides may be used to control the volume of the waves. A lens system 3 is mounted in front of the condensers and color waves slides so that converging, diverging and parallel waves may be projected from the machine for treating various areas of the body.

When the projector is to be used in the treatment of diseases, the current is turned on thereby lighting the lamp and starting the blower fan. The two blank apertures in the slide carriers are centered between the condensers and the light is focused to the desired beam by means of the lenses on the areas of the body being treated, its intensity being further controlled by the iris diaphragm 25.

If a single color wave slide is to be used the bolts 13, 13' are retracted and the slide carrying disks turned until the desired color wave slide is between the condensers, and the blank or focusing aperture on the other disk is centered between the condensers. Inscriptions are preferably made on the disk edges indicating the color slide between the condensers when the bolt engages the marked notch.

While I have named colors in the following paragraph I am in reality dealing with oscillation frequencies measuring in Angstrom units, red being 7000 Angstrom units; orange, 6500 Angstrom units; yellow, 6000 Angstrom units; green 5500 Angstrom units; blue, 5000 Angstrom units; violet, 4000 Angstrom units, and so on with other colors.

It is apparent that the red, green, violet, blue and yellow color wave slides may be used separately. The following combinations may be produced by using the color wave slides conjointly:—

Red and yellow produce orange.
Yellow and green produce lemon.
Green and blue produce turquoise.
Blue and violet produce indigo.
Violet and yellow produce purple.
Violet and red produce magenta.
Blue and red produce scarlet.

It is thus apparent that five different color wave slides will enable me to select twelve separate portions of the spectrum for use in the treatment of diseases but that the red must be duplicated and be present on each color wave slide carrier disk to produce this result.

As it is absolutely essential that the separate color wave slides oscillate in wave lengths to their respective proper positions in the spectrum and when combined the combinations will also produce their proper wave lengths it is necessary to do this testing and mounting in the laboratory and to prevent unauthorized and incompetent persons tampering with or attempting to replace damaged color wave slides. To this end, color wave slides are mounted on the flanged sides of the carriers so that when they are on the shaft they are practically inside a drum and the screws holding the rings to the carriers have their heads inside this drum. After assembly a hole drilled through the small end of the shaft and the disk lock 26 receives a wire and seal so that any tampering with the color wave slides can be at once detected. In event of damage to one or more color wave slides it is necessary to lift out the color wave slide carriers as a unit and return them to the laboratory for the insertion of new color wave slides tested and adjusted, matching or attuning the rest of the set in their proper respective wave lengths.

I claim:—

1. A color wave slide carrier for projection apparatus comprising two apertured disks, color wave slides secured to said disks over certain of said apertures, the disks being provided with bearing apertures of different diameters and a shaft of different diameters, each diameter being adapted to engage the appropriate bearing aperture in a disk.

2. A color wave slide carrier for projection apparatus comprising two apertured disks each provided with a flanged edge, color wave slides secured to said disks over certain of the apertures and on the flanged side of the disks, the disks being provided with bearing apertures of different diameters and a shaft of different diameters, each diameter being adapted to engage the appropriate bearing in a disk, the disk flanges meeting, whereby the color wave slides are within the thus formed drum.

3. A color wave slide carrier for projection apparatus comprising bearings of different diameters, two apertured disks, color wave slides secured to said disks over certain of said apertures, the disks being provided with bearing apertures of different diameters, and a shaft of four different diameters, the end diameters engaging the appropriate bearings and the middle diameters engaging the appropriate disk bearing apertures.

4. Color wave projection apparatus comprising a lens system, a color wave slide carrier comprising a pair of apertured, notched-edge disks, a shaft on which said disks revolve with the apertures in line with the lens system, color wave slides secured to the disks over certain of the disk apertures and locking bolts adapted to enter the disk edge notches when the apertures are in line with the lens system.

5. Color wave projection apparatus comprising a lens system, a color wave slide carrier comprising a pair of apertured notched-edge disks, a shaft on which said disks revolve with the apertures in line with the lens system, color wave slides secured to the disks over certain of the apertures and locking bolts adapted to enter the disk edge notches when the apertures are in line with the lens system, the name of the color of the color wave slide in line with the lens system being inscribed on the disk alongside the notch engaging the bolt.

In testimony whereof I have affixed my signature.

DINSHAH P. GHADIALI.